(12) United States Patent
Lai

(10) Patent No.: US 8,285,130 B1
(45) Date of Patent: Oct. 9, 2012

(54) PHOTOGRAPHY STUDIO WITH TURNTABLE DRIVING MECHANISM

(75) Inventor: Peng-Cheng Lai, Los Altos, CA (US)

(73) Assignee: Ortery Technologies, Inc., New Taipei (TW)

(*) Notice: Subject to any disclaimer, the term of this patent is extended or adjusted under 35 U.S.C. 154(b) by 0 days.

(21) Appl. No.: 13/163,087

(22) Filed: Jun. 17, 2011

(51) Int. Cl.
*G03B 15/00* (2006.01)

(52) U.S. Cl. .......................................................... 396/5

(58) Field of Classification Search ........ 396/5; 348/50, 348/37; 40/456; 104/43, 41; 108/20
See application file for complete search history.

(56) References Cited

U.S. PATENT DOCUMENTS

| 2,509,054 A * | 5/1950 | Davis .............................. 474/67 |
| 6,106,124 A * | 8/2000 | Tarsia .............................. 362/6 |
| 2001/0053284 A1* | 12/2001 | Shin ................................. 396/5 |
| 2010/0128462 A1* | 5/2010 | Chern et al. ................... 362/84 |

* cited by examiner

*Primary Examiner* — Clayton E Laballe
*Assistant Examiner* — Noam Reisner

(57) ABSTRACT

A photography studio with a turntable driving mechanism is provided. The turntable is driven to start or brake by at least two timing pulleys contacting with the side of the turntable, and the timing pulleys were driven synchronously by another motorized timing pulley through a timing belt. Therefore, at least two indirect contact points are formed between the motorized timing pulley and the turntable to increase the contact friction to avoid sliding when the rotation of the turntable starts or brakes. In addition, a multilayer platform for shooting shadow-free images is proposed, which comprises a thicker transparent glass plate or plastic plate covered with a thinner curved translucent plastic plate and a group of lamps disposed under or behind the multilayer platform.

13 Claims, 7 Drawing Sheets

PHOTOGRAPHY STUDIO WITH TURNTABLE DRIVING MECHANISM

FIELD OF THE INVENTION

The present invention generally relates to a photography studio, and more particularly to a photography studio with a turntable driving mechanism.

DESCRIPTION OF THE RELATED ART

In the conventional art for taking a shadow free plane 2D image, the light is projected from the back of a curved surface of a thicker translucent plastic platform (for example larger than 1 cm) capable of bearing the weight of a photographed object to take shadow free images. However, the thicker translucent plastic platform (as illustrated FIG. 1) is difficult to be formed and has a lower light transmittance to have the issues of energy waste and poor result in taking shadow free images.

Furthermore, for taking a shadow free stereoscopic 3D image, the system illustrated in FIG. 2 is used, wherein a motor 1 directly drives, via a connected shaft 2, a transparent or translucent round platter 3 to rotate or brake. In addition, a plurality of rollers 4 is set under the bottom to support the round platter 3, which is embedded into a curved translucent plastic plate 5. However, because the flatness between the curved translucent plastic plate 5 and the round platter 3 is not perfect or the shaft 2 and the rollers 4 under the bottom of the curved translucent plastic plate 5 are also dimly visible, the result of taking shadow free images is worse.

SUMMARY OF THE INVENTION

The present invention is directed to a photography studio or a light box, which may be used for taking a shadow free plane 2D or stereoscopic 3D image, even can get a pure white background, to omit the background removal process. Specifically for a stereoscopic 3D image stitched from a lot of plane 2D images, it saves big time on background removal process once such a photography studio or light box is applied.

The present invention is also directed to taking a shadow free stereoscopic 3D image by using the above mentioned photography studio or light box, which accompanies with a transparent glass round platter, a transparent plastic round platter or a translucent plastic round platter, so as to reduce slippery situation when a turntable driving mechanism drives the round platter to start or brake rotating. Therefore, it is capable of locating each different shooting angles more accurately, and thus the composed stereoscopic 3D image is much smoother.

The present invention provides a multi-layers platform capable of taking a plane 2D image. In such multi-layers platform, a thicker transparent glass plate or plastic plate (for example 5 mm) is used as a base plate, and a curved thinner translucent plastic plate (for example 2 mm), which may be formed by manually bended from a plane plate or directly formed by plastic injection molding, is disposed on the base plate, so as to form a high light transmission multi-layered platform. The curved translucent plastic plate covered on the thicker transparent glass plate or plastic plate can avoid showing the items thereunder, and the thicker transparent glass plate or plastic plate can bear the weight of a photographed object.

In addition, the present invention further provides a turntable driving mechanism for taking a stereoscopic 3D image. In such turntable driving mechanism, a motive source (for example a motor) drives a timing pulley set with at least two timing pulleys by a timing belt or drives a gear set with at least two gears or a large gear to rotate by another small gear. Therefore, the timing pulley set or the gear set contacts a side surface of the transparent glass or plastic round platter with multi-points (at least two points) or a side surface of the large gear, so as to synchronously start or brake the rotation of the round plate or the large gear to avoid sliding, which is seriously caused by that with only one smooth contact point.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 2:
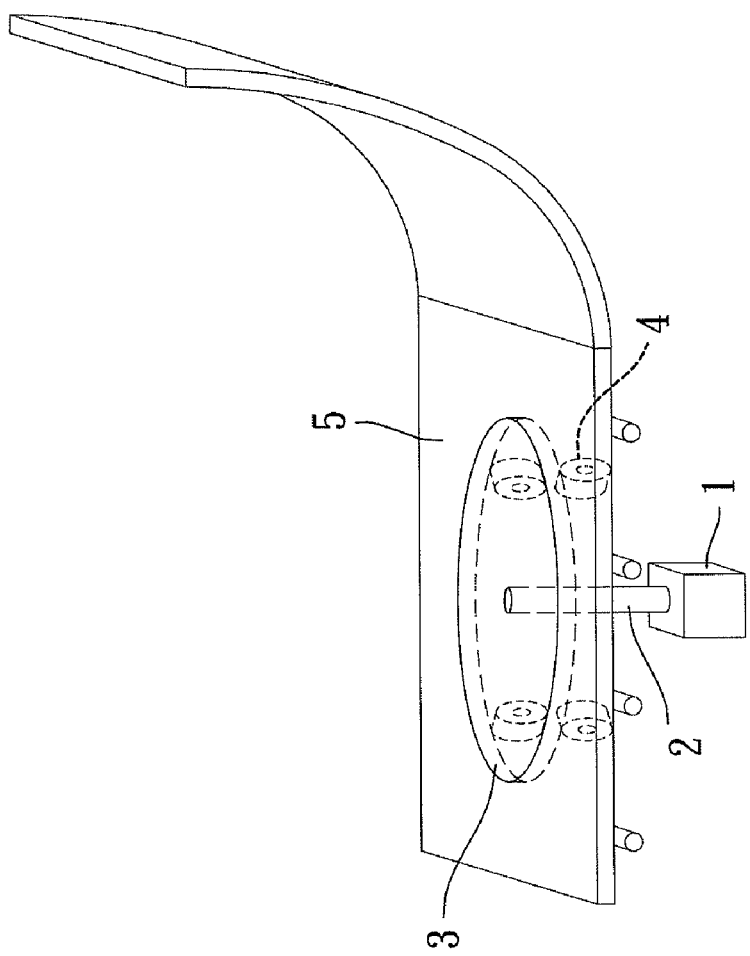
FIG. 2 illustrates a schematic view of a curved translucent plastic plate embedded with a turntable directly according to a traditional art.
Figure 1:
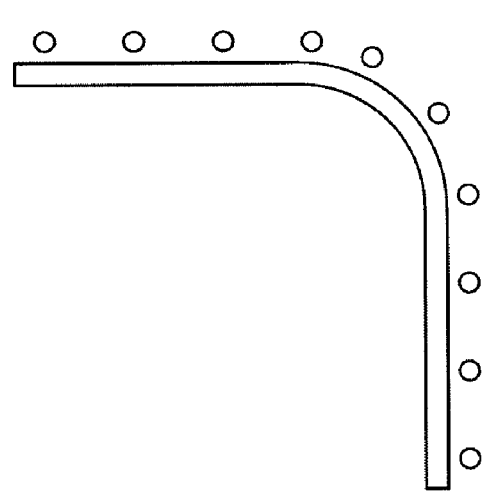
FIG. 1 illustrates a side view of a platform practiced by a curved translucent plastic plate with a thicker thickness according to a traditional art.
Figure 3:
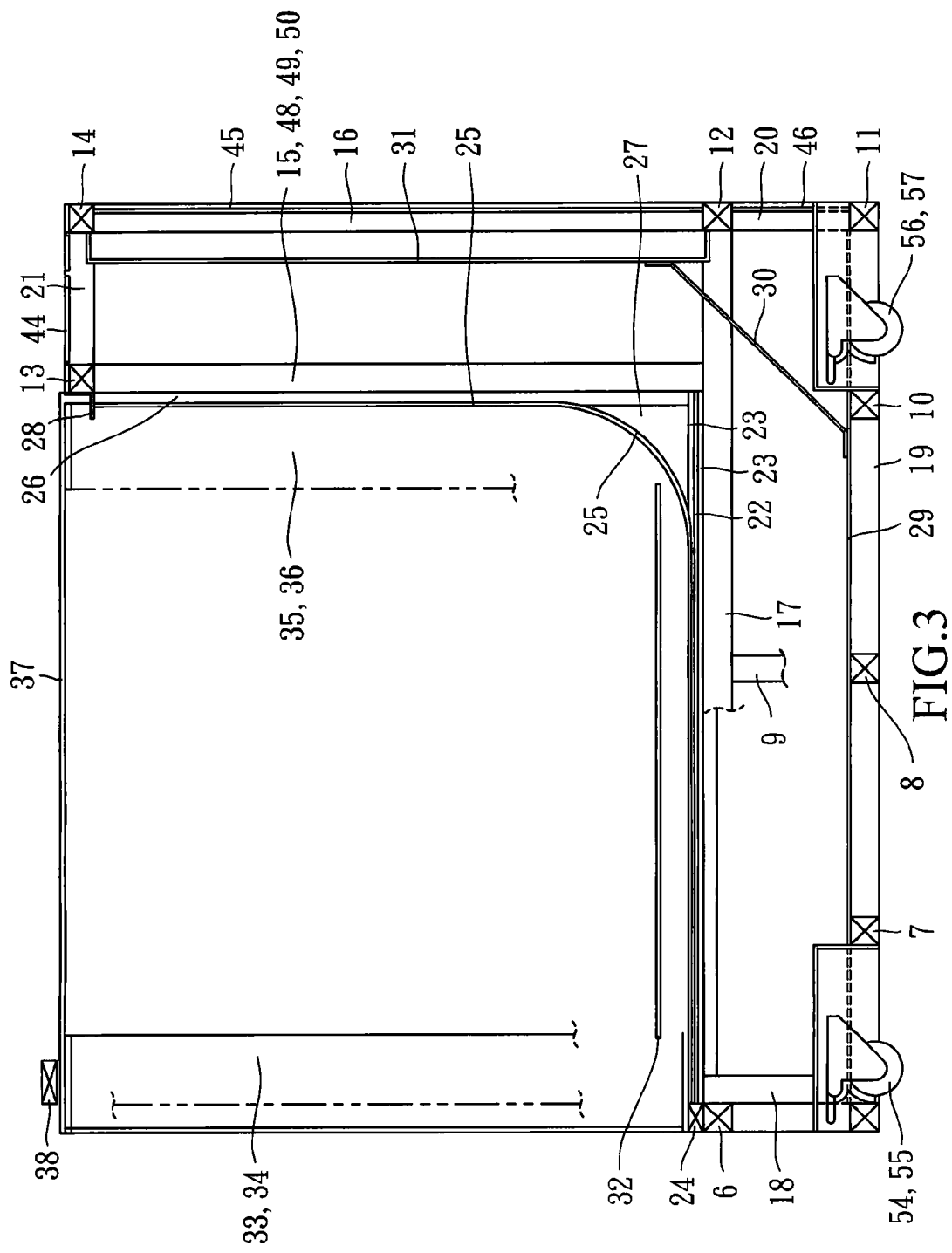
FIG. 3 illustrates a side view of a photography studio with a turntable driving mechanism according to an embodiment of the present invention.

FIG. 3 illustrates a side view of a photography studio with a turntable driving mechanism according to an embodiment of the present invention. FIG. 3 illustrates main components of the present invention only, wherein a main structure of the photography studio is composed of aluminum frames 6~21. A transparent glass plate 22 is inserted into an aluminum frame 23 from a side of the aluminum frame 23, and a front edge and a rear edge thereof are respectively held by the aluminum frames 24 and 15. Furthermore, a translucent plastic plate 25 with a thinner thickness is inserted into a guiding frame 26, a guiding block 27 and the aluminum frame 23 from a top of the guiding frame 26 to form a curved surface, and a horizontal portion thereof covers on the top of the transparent glass plate 22. In addition, a front edge and a rear edge of the bended translucent plastic plate 25 are held by an L type fixing plate 28 and the aluminum frame 24 respectively. Besides, tops of lamp holding plates 29, 30 and 31 are all disposed with a plurality of lamp holders (not shown) and a plurality of lamps (not shown). Therefore, it is capable of obtaining a shadow free picture when a photographed object is put on the translucent plastic plate 25 for taking a plane 2D image.

In another word, a multi-layers platform in the present embodiment is composed of the curved translucent plastic plate 25 and the transparent glass plate 22 (may be replaced by a curved transparent plastic plate). As illustrated in FIG. 3, the curved translucent plastic plate 25 has a horizontal portion, a vertical portion and a curved surface connecting between the horizontal portion and the vertical portion. The horizontal portion is disposed over a bottom side lighting group composed of the lamp holding plate 29, the lamp holders and the lamps disposed on the lamp holding plate 29. In addition, the transparent glass plate 22 is disposed between the horizontal portion and the bottom side lighting group, and formed as multi-layers with the horizontal portion. Besides, the curved surface and the vertical portion extend from the horizontal portion towards away from the bottom side lighting group, i.e. upwards. Moreover, a rear side lighting group is composed of the lamp holding plates 30, 31 and the lamp holders and the lamps disposed on the lamp holding plates 30, 31, and the rear side lighting group and the bottom side lighting group are disposed at the same side of the translucent plastic plate 25, i.e. the bottom right side of the curved surface and the right side of the vertical portion.

In addition, the light transmissive round platter is disposed over the horizontal portion of the curved translucent plastic plate 25, and capable of carrying the photographed object for taking a stereoscopic 3D image. In the present embodiment, the light transmissive round platter is illustrated as a transparent glass round platter 32. However, in other embodiments, the light transmissive round platter may be a transparent plastic round platter, a translucent plastic round platter, a transparent glass round platter covered by a translucent plastic round platter or a transparent plastic round platter covered by a translucent plastic round platter as well. Therefore, the light provided by the bottom side lighting group transmits through the transparent glass plate 22 and the curved translucent plastic plate 25 in sequence when the bottom side lighting group is turned on. Accordingly, it is capable of obtaining a shadow free stereoscopic 3D image when a photographed object is put on the transparent glass round platter 32 for taking images.

Each of columns 33, 34, 35 and 36 of the present photography studio is disposed with a lamp therein for lighting during taking images. Moreover, a top cover 37 is disposed over the present photography studio, and the top cover 37 is fixed by rotation knobs 38, 39, 40 and 41. Besides, each of the columns 33, 34, 35 and 36 is disposed with diffusion plates 42, 43 and so on. In addition, covering plates 44, 45 and 46 cover spaces of the top surface and the side surface of the present photography studio respectively, wherein each of the spaces is formed among aluminum frames. Furthermore, casters 54, 55, 56 and 57 are capable of not only supporting a weight of the whole photography studio, but also carrying the photography studio to move.

Figure 4:
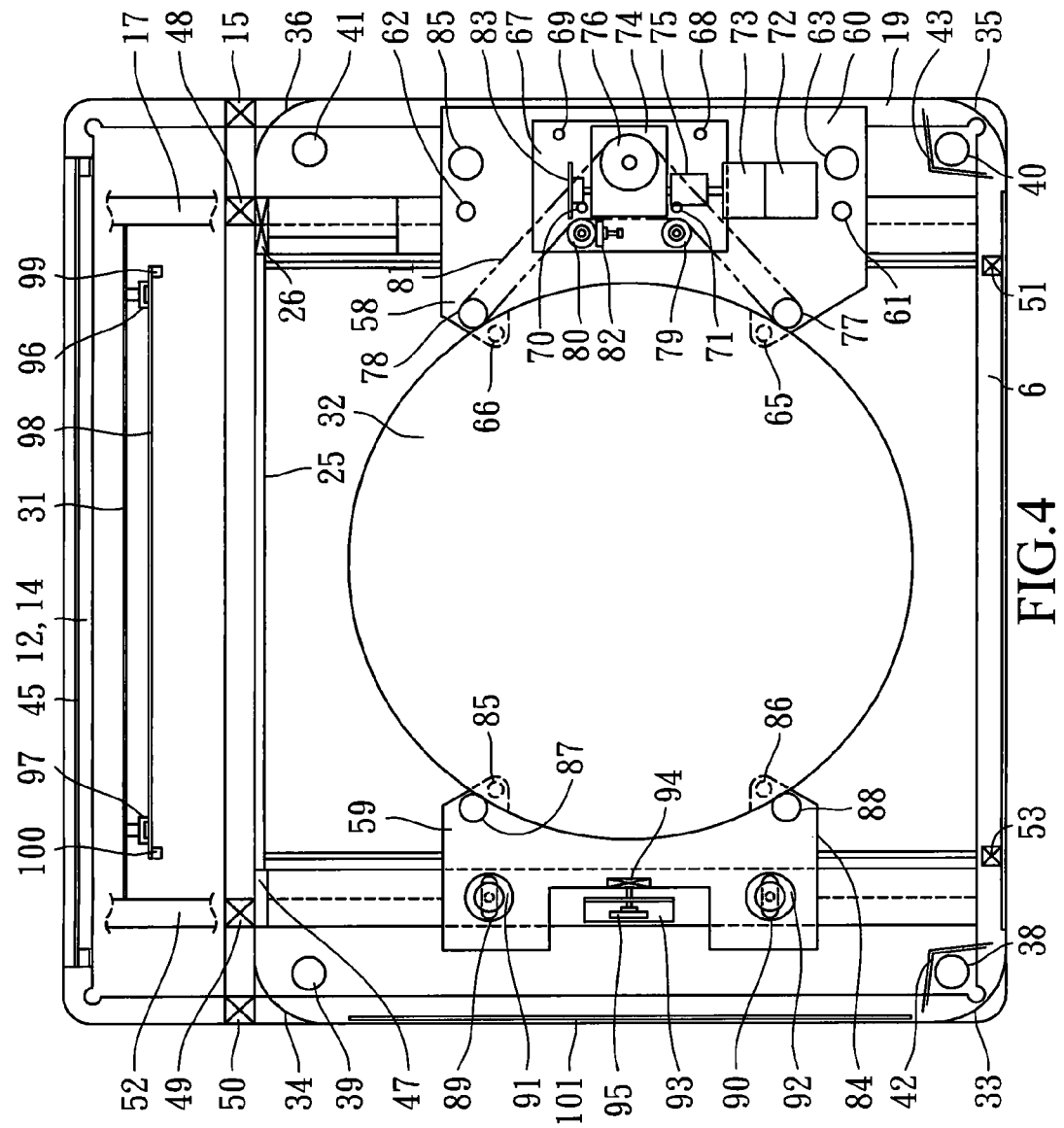
FIG. 4 illustrates a top view of a photography studio with a turntable driving mechanism according to an embodiment of the present invention.

FIG. 4 illustrates a top view of a photography studio with a turntable driving mechanism according to an embodiment of the present invention. FIG. 4 illustrates main components of the present invention only, wherein a main structure of the photography studio is composed of aluminum frames 6, 12, 14, 15, 17 and 48~53. The translucent plastic plate 25 is inserted between the guiding frames 26 and 47. Moreover, the transparent glass round platter 32 is placed between the turntable driving unit 58 and the turntable supporting unit 59 from the top side. A chassis 60 of the turntable driving unit 58 is fixed on the right aluminum frame of the preset photography studio by inserting lock pins 61 and 62 into the aluminum frame and screwing rotation knobs 63 and 64 into the aluminum frame. Besides, ball rollers 65 and 66 are disposed on the chassis 60 and capable of supporting the transparent glass round platter 32. A fixing plate 67 is fixed on the chassis 60 and lifted up by posts 68, 69, 70 and 71. In addition, a motor 72, a gear reducer 73 and a gear chamber 74 are disposed on the fixing plate 67 and connected by a coupling 75. The motor 72 drives a timing pulley 76 disposed on an output shaft of the gear chamber 74 to rotate through the gear reducer 73, the coupling 75 and the gear chamber 74. Furthermore, two timing pulleys 77 and 78 are disposed to the chassis 60 and adjacent to the transparent glass round platter 32, while two timing pulleys 79 and 80 are disposed on the fixing plate 67, and then a timing belt 81 concatenates the timing pulleys 76, 77, 78, 79 and 80. Moreover, a tension adjuster 82 is capable of adjusting a horizontal position of the timing pulley 80, and thus a tightness of the timing belt 81 is adjustable. Therefore, when the timing pulley 76 rotates, the timing pulley 76 drives the timing pulleys 77, 78, 79 and 80 to rotate simultaneously, so as to start or brake the rotation of the transparent glass round platter 32 due to upper edges of the timing pulleys 77 and 78 directly contact with the side surface of the transparent glass round platter 32. In addition, a raster 83 is disposed to the other output shaft of the gear chamber 74 for controlling a rotation angle of the transparent glass round platter 32. Herein, the turntable driving unit 58 is assembled as a cartridge individually in order to be assembled and disassembled more easily.

Ball rollers 85 and 86 are disposed on a chassis 84 of the turntable supporting unit 59 and capable of supporting the transparent glass round platter 32 together with the ball rollers 65 and 66 of the turntable driving unit 58. Furthermore, non-powered idlers 87 and 88 are disposed on the turntable supporting unit 59 and directly contact the transparent glass round platter 32 with upper edges thereof. Besides, each of the upper edges of the timing pulleys 77 and 78 and the idlers 87 and 88 is embedded with a rubber ring for contacting with the side surface of the transparent glass round platter 32 directly. In addition, an L type fixing plate 93 is disposed on the aluminum frame, and a stopper 94 is dispose on the chassis 84. After unscrewing the rotation knobs 91 and 92 located on the guiding slots 89 and 90, the whole turntable supporting unit 59 may be pushed toward the transparent glass round platter 32 by screwing the rotation knob 95 disposed on the L type fixing plate 93, and thus a tightness that the idlers 87, 88 contact with the side surface of the transparent glass round platter 32 is adjustable. Herein, the turntable supporting unit 59 is assembled as a cartridge individually, which means that the turntable supporting unit 59 and the chassis 84 are capable of being assembled and disassembled rapidly.

Furthermore, lamp holders 96 and 97 are disposed on the lamp holding plate 31, and a plurality of lamps 98 are disposed between the lamp holders 96 and 97. Besides, each of the lamps has connectors 99 and 100 for connecting electric powers, so as to form the above mentioned rear side lighting group. In addition, a side plate 101 is inserted between the two columns 33, 34 at a side of the present photography studio. Moreover, each of the turntable driving unit 58 and the turntable supporting unit 59 may be covered with a top cover, so as to form a cartridge individually in order to be assembled and disassembled more easily.

Note that a photography studio composed of the transparent/light transmissive glass round plate 32, the turntable driving unit 58, the rear side lighting group and the bottom side lighting group is an opened photography studio. Relatively, a photography studio composed of the transparent/light transmissive glass round plate 32, the turntable driving unit 58, the rear side lighting group, the bottom side lighting group, the columns 33, 34, 35 and 36 and the side plate 101 between the columns is an enclosed photography studio.

Figure 5:
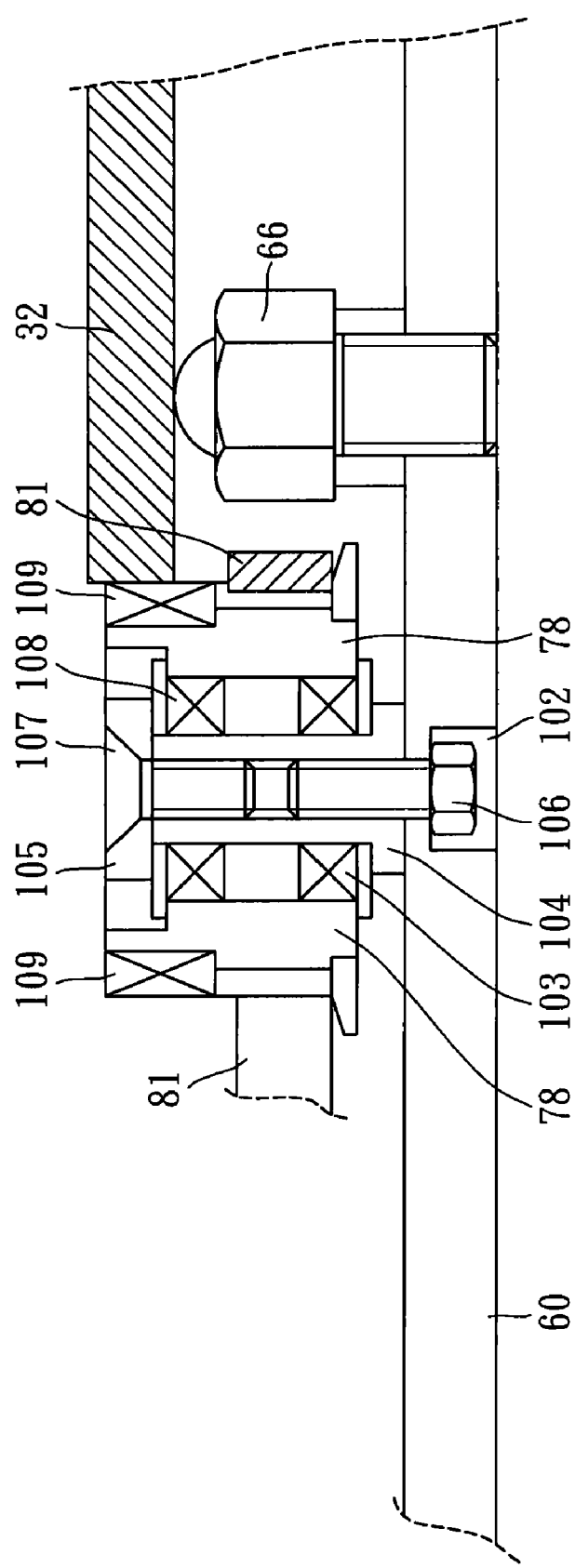
FIG. 5 illustrates a cross sectional view of a contact point between a glass round platter and a turntable driving mechanism of a photography studio with the turntable driving mechanism according to an embodiment of the present invention.

FIG. 5 illustrates a cross sectional view of a contact point between a glass round platter and a turntable driving mechanism of a photography studio with the turntable driving mechanism according to an embodiment of the present invention. In the present embodiment, the ball roller 66 withstands the edge of the transparent glass round platter 32 from the bottom. Moreover, the chassis 60 is drilled a hole 102, two bearings 103 and 108 are inserted into the timing pulley 78, and two opposite ends of the bearings 103 and 108 are sealed up with an axis shaft 104 and an ending cap 108. After that, a hex socket cap screw 106 and a flat head screw 107 are respectively screwed from the bottom side and the top side, so as to fix the whole timing pulley 78 on the chassis 60. Furthermore, a rubber ring 109 encloses an upper edge of the timing pulley 78 for increasing the friction between the upper edge of the timing pulley 78 and the side surface of the transparent glass round platter 32. Therefore, the issue of slipping at starting and braking the transparent glass round platter 32 can be reduced. Besides, the detail structure of the timing pulley 77 is similar to that of the timing pulley 78 and thus omitted herein.

Figure 6:
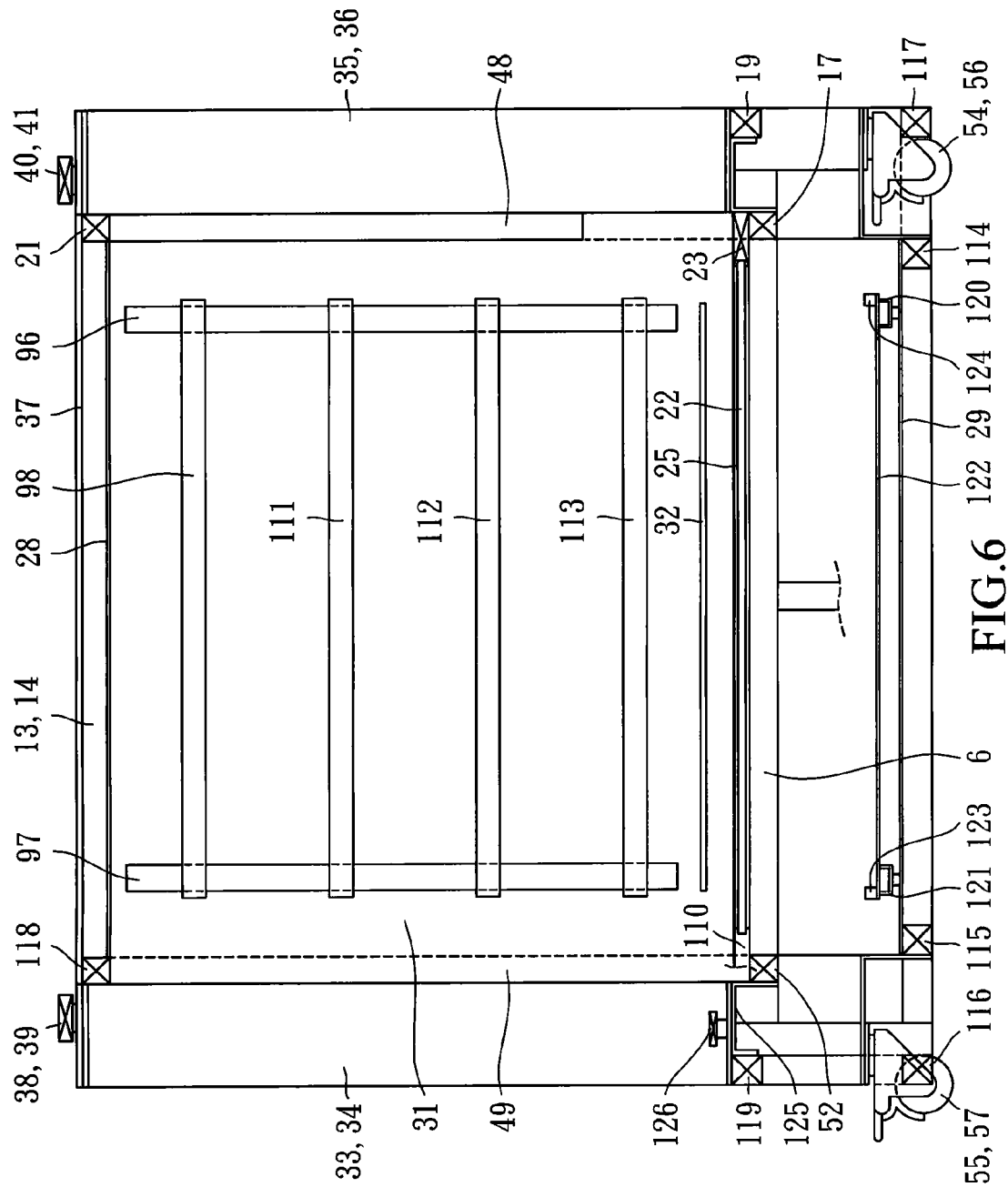
FIG. 6 illustrates a front view of a photography studio with a turntable driving mechanism according to an embodiment of the present invention.

FIG. 6 illustrates a front view of a photography studio with a turntable driving mechanism according to an embodiment of the present invention. FIG. 6 illustrates main components of the present invention only, wherein a main structure of the photography studio is composed of aluminum frames 13, 14, 17, 19, 21, 48, 49, 52 and 114~119. In the present embodiment, the lamp holders 96 and 97 are disposed on the lamp holding plate 31, and the lamps 98, 111, 112 and 113 are disposed on the lamp holders 96 and 97, so as to form the rear side lighting group described above for lighting the background. Besides, lamp holders 120 and 121 are disposed on the lamp holding plate 29, and a plurality of lamps, such as lamps 122, are disposed thereon, so as to form the bottom side lighting group described above for lighting the bottom side. Moreover, two ends of the lamps 122 have connectors 123 and 124 for connecting electric powers. Further, the columns 33, 34, 35 and 36 are disposed at four corners of the present photography studio, and the top cover 37 is disposed on the top of the present photography studio, wherein the top cover 37 is fixed on the four columns 33, 34, 35 and 36 by using the rotation knobs 38, 39, 40 and 41, and the column 33 is fixed on a bracket 125 by using a rotation knob 126. In addition, the transparent glass plate 22 and the translucent plastic plate 25 are inserted between the aluminum frames 23 and 110, and the transparent glass round platter 32 is disposed thereon. Furthermore, the casters 54, 55, 56 and 57 are disposed at four corners of the bottom of the present photography studio and thus capable of carrying the present photography studio to move.

Figure 7:
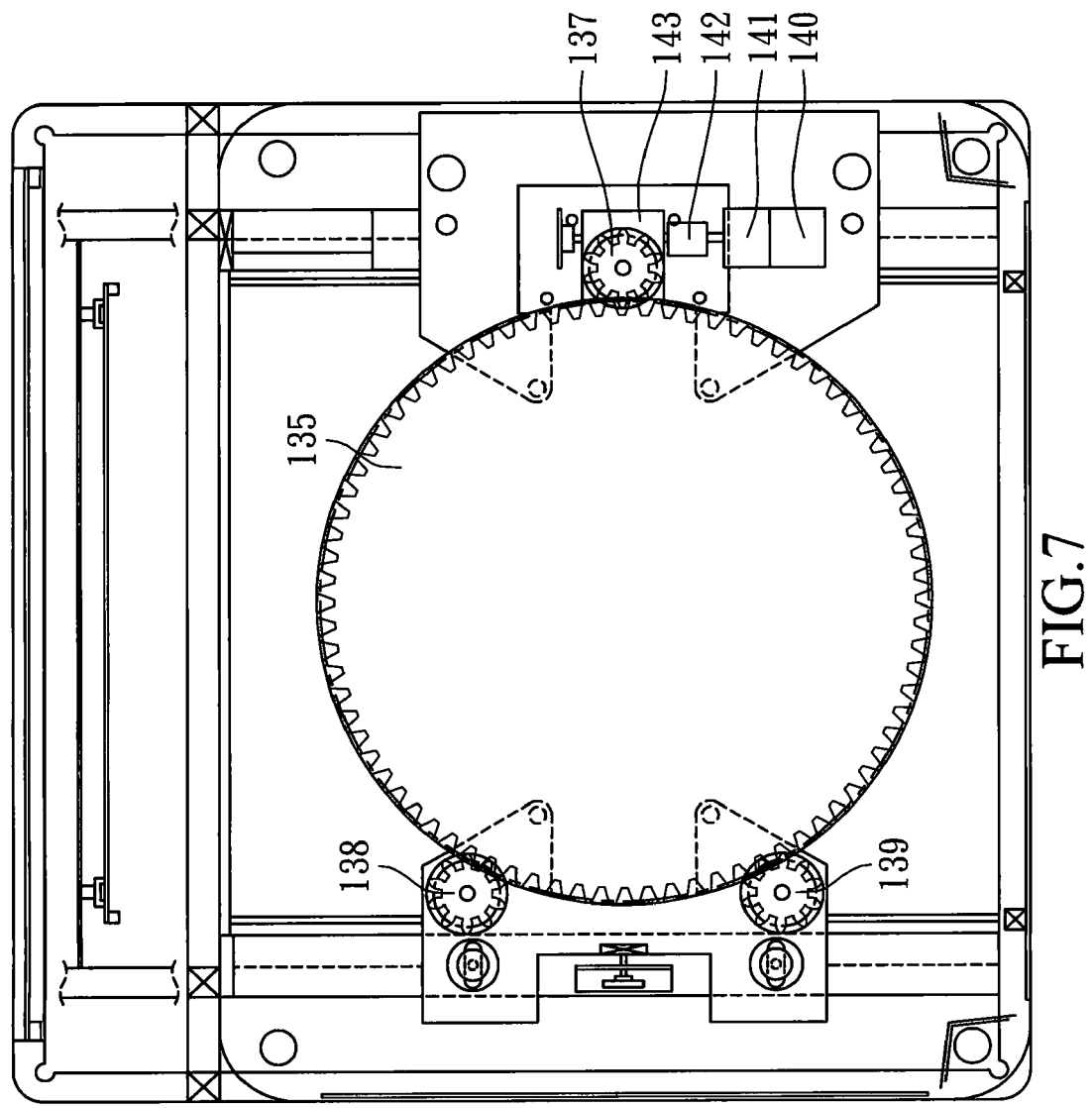
FIG. 7 illustrates a top view of a photography studio with a driving mechanism practiced by using a small gear to drive a light transmissive large gear according to another embodiment of the present invention.

FIG. 7 illustrates a top view of a photography studio with a driving mechanism practiced by using a small gear to drive a light transmissive large gear according to another embodiment of the present invention. The detail structures of the present embodiment are substantially similar to that of the previous embodiment, besides the present embodiment uses a light transmissive large gear 135 to replace the glass round platter 32 of the previous embodiment, and further uses small gears 137, 138 and 139 to replace the timing pulleys 76, 77, 78, 79, 80 and idlers 87, 88 of the previous embodiment. Therefore, the timing belt 81 of the previous embodiment is omitted.

The light transmissive large gear 135 may be a transparent glass large gear, a transparent plastic large gear or a translucent plastic large gear, or may be a combination of a light transmissive round platter and an annular light transmissive plastic large gear fitting around the light transmissive round platter. Herein, a translucent plastic round platter may further use to cover on the light transmissive large gear 135.

In the present embodiment, a motor 140 drives a small gear 137 disposed on an output shaft of a gear chamber 143 to rotate through a gear reducer 141, a coupling 142 and the gear chamber 143, so as to drive the light transmissive large gear 135 to rotate. Moreover, the small gears 137, 138 and 139 engage with the light transmissive large gear 135 from different directions, so as to drive the light transmissive large gear 135 to rotate with more stability and less slip. In addition, a bottom side lighting group may further be disposed under the light transmissive large gear 135.

Furthermore, the present embodiment may further comprises a multi-layers platform, wherein the curved translucent plastic plate has a horizontal portion, a vertical portion and a curved surface connecting between the horizontal portion and the vertical portion. Herein, the horizontal portion is disposed between the bottom side lighting group and the light transmissive large gear 135, and the curved surface and the vertical portion extend from the horizontal portion towards away from the bottom side lighting group. Moreover, the transparent glass plate or the transparent plastic plate is disposed between the horizontal portion and the bottom side lighting group, and formed as multi-layers with the horizontal portion. Besides, the present embodiment may further comprises a rear side lighting group, wherein the rear side lighting group is disposed adjacent to the curved surface and the vertical portion, and disposed at the same side of the curved translucent plastic plate with the bottom side lighting group.

Figure 8:
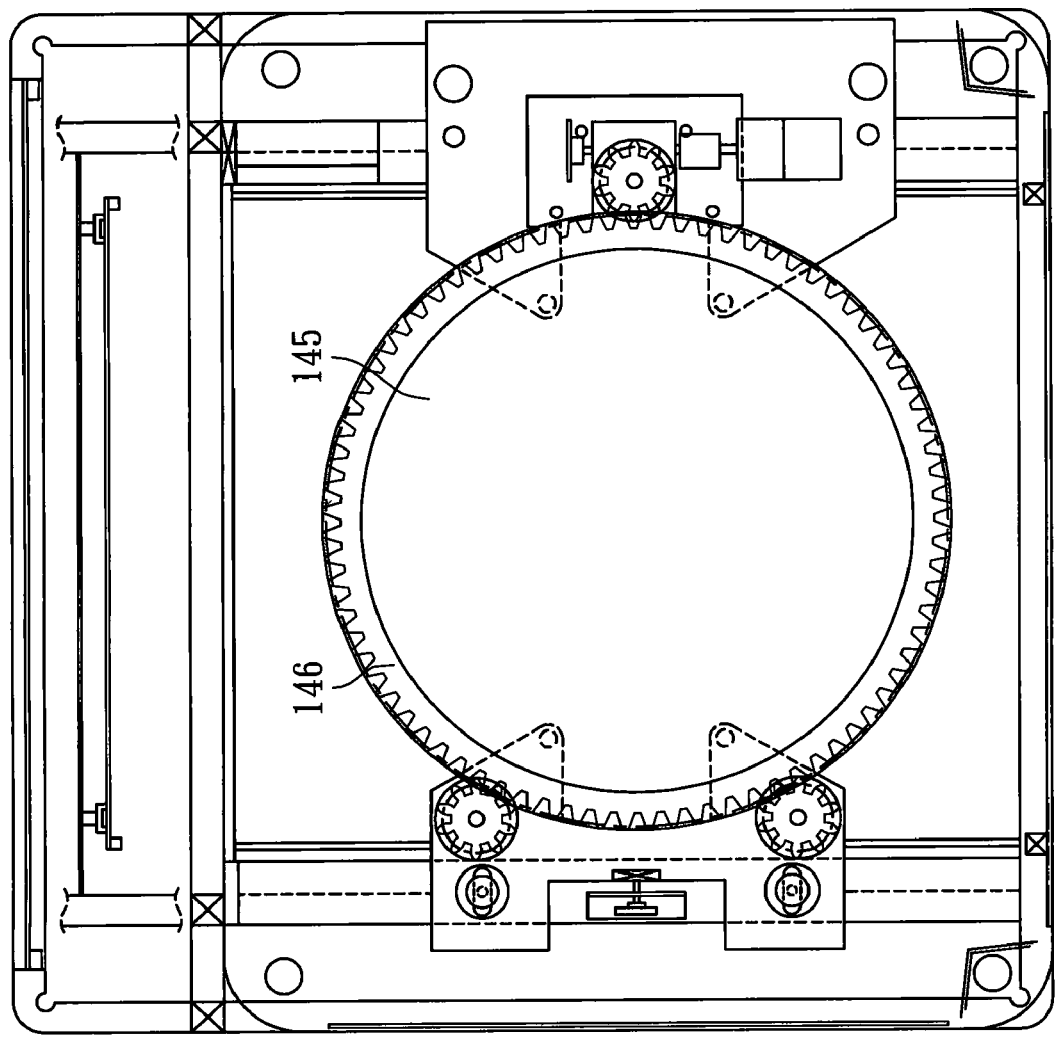
FIG. 8 illustrates a top view of a photography studio with a driving mechanism practiced by using a small gear to drive an annular light transmissive plastic large gear fitting around a light transmissive round platter according to another embodiment of the present invention.

FIG. 8 illustrates a top view of a photography studio with a driving mechanism practiced by using a small gear to drive an annular light transmissive plastic large gear fitting around a light transmissive round platter according to another embodiment of the present invention. The detail structures of the present embodiment are substantially similar to that of the previous embodiment besides the annular light transmissive plastic large gear. In a word, since a gear is difficult to be made of glass directly, the light transmissive large gear 135 of the previous embodiment may further be replaced by a light transmissive round platter 145 made of glass and an annular light transmissive plastic large gear 146 made of plastic that is fitting around the light transmissive round platter 145 of the present embodiment, and thus the manufacturing cost of the light transmissive large gear can be saved. In the present embodiment, the light transmissive round platter 145 may be composed of at least one of a transparent glass round platter, a transparent plastic round platter and a translucent plastic round platter, and the annular light transmissive plastic large gear 146 also could be an annular transparent glass large gear or an annular translucent plastic large gear. Also, functions and advantages of the present invention are substantially similar to that of the previous embodiment and omitted herein.

In summary, when using the multi-layers platform provided by the present invention for taking a plane 2D image, the transparent glass plate or the transparent plastic plate with a thicker thickness can carry a heavier photographed object and have higher light transmittance. Moreover, the curved translucent plastic plate covering over the transparent glass plate or the transparent plastic plate and having a thinner thickness can be used as a background, so as to avoid the items located under the transparent glass plate or the transparent plastic plate being taken in the image. Therefore, it is not only saving more energy but also obtaining better shadow free result by using the multi-layers platform provided by the present invention for taking a plane 2D image. Furthermore, by further providing light around the photographed object properly, it is able to generate images with benefits such as pure white, shadow free and unnecessary to do background removal and so on. On the contrary, it is unable to carry a heavier photographed object by only using a curved translucent plastic plate with a thinner thickness.

In addition, it is able to further dispose a transparent glass round platter, a transparent plastic round platter or a translucent plastic round platter on the multi-layers platform, and start or brake the rotation of the above mentioned round platter synchronically by the timing pulleys with at least two contact points between the side surface of the round platter and the timing pulleys. Note that during taking a stereoscopic 3D image formerly, it is necessary to spend a lot of times to do background removal before composing the significant amount of plane 2D images generated from different shooting angles into a stereoscopic 3D image file. However, it is able to reduce the issue of slips when the turntable is driven to rotate by using the turntable driving mechanism of the present invention. Therefore, it is able to control the shooting angles more accurately and thus saving a lot of times for doing background removal when using the turntable driving mechanism together with the above mentioned multi-layers platform to take a shadow free stereoscopic 3D image.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A photography studio with a turntable driving mechanism, comprising:
    a light transmissive round platter for carrying a photographed object;
    a turntable driving unit, comprising:
    a plurality of timing pulleys;
    a motor, connecting with one of the timing pulleys; and
    a timing belt, fitting onto the timing pulleys, and at least two of the timing pulleys driven by the timing belt and contacting with a side surface of the light transmissive round platter with upper edges thereof, wherein the motor is capable of driving the timing pulley connecting with the motor to rotate for rotating the timing belt, and thus the timing pulleys contacting with the side surface of the light transmissive round platter is driven to rotate by the timing belt, so as to start or brake the light transmissive round platter;
    a turntable supporting unit, comprising a plurality of idlers, and the idlers and some of the timing pulleys contacting the side surface of the light transmissive round platter from different directions; and
    a bottom side lighting group, disposed under the light transmissive round platter.

2. The photography studio with the turntable driving mechanism as claimed in claim 1, wherein the light transmissive round platter is composed of at least one of a transparent glass round platter, a transparent plastic round platter and a translucent plastic round platter.

3. The photography studio with the turntable driving mechanism as claimed in claim 1, further comprising a multi-layers platform, wherein the multi-layers platform comprises:
    a curved translucent plastic plate, having a horizontal portion, a vertical portion and a curved surface connecting between the horizontal portion and the vertical portion, wherein the horizontal portion is disposed between the light transmissive round platter and the bottom side lighting group, and the curved surface and the vertical portion extend from the horizontal portion towards away from the bottom side lighting group; and
    a transparent glass plate or a transparent plastic plate, disposed between the horizontal portion and the bottom side lighting group, and formed as a multi-layers with the horizontal portion.

4. The photography studio with the turntable driving mechanism as claimed in claim 3, further comprising a rear side lighting group, wherein the rear side lighting group is disposed adjacent to the curved surface and the vertical portion, and disposed at the same side of the curved translucent plastic plate with the bottom side lighting group.

5. The photography studio with the turntable driving mechanism as claimed in claim 1, wherein the photography studio is an enclosed photography studio or an opened photography studio.

6. The photography studio with the turntable driving mechanism as claimed in claim 1, wherein the turntable driving unit is assembled as a cartridge individually.

7. The photography studio with the turntable driving mechanism as claimed in claim 1, wherein the turntable supporting unit is assembled as a cartridge individually.

8. A photography studio with a turntable driving mechanism, comprising:
    a light transmissive large gear, capable of carrying a photographed object;
    a turntable driving unit, comprising:
    a small gear, engaging with the light transmissive large gear; and
    a motor, connecting with the small gear, wherein the motor is capable of driving the small gear to rotate, so as to start or brake the light transmissive large gear;
    a turntable supporting unit, supporting the light transmissive large gear together with the turntable driving unit and comprising a plurality of other small gears, wherein the small gear and the other small gears engage with the light transmissive large gear from different directions; and
    a bottom side lighting group, disposed under the light transmissive large gear.

9. The photography studio with the turntable driving mechanism as claimed in claim 8, wherein the light transmissive large gear is a transparent glass large gear, a transparent plastic large gear or a translucent plastic large gear, or is a combination of a light transmissive round platter and an annular light transmissive plastic large gear fitting around the light transmissive round platter.

10. The photography studio with the turntable driving mechanism as claimed in claim 9, wherein the light transmissive large gear is further covered by a translucent plastic round platter.

11. The photography studio with the turntable driving mechanism as claimed in claim 8, further comprising a multi-layers platform, wherein the multi-layers platform comprises:
   a curved translucent plastic plate, having a horizontal portion, a vertical portion and a curved surface connecting between the horizontal portion and the vertical portion, wherein the horizontal portion is disposed between the light transmissive large gear and the bottom side lighting group, and the curved surface and the vertical portion extend from the horizontal portion towards away from the bottom side lighting group; and
   a transparent glass plate or a transparent plastic plate, disposed between the horizontal portion and the bottom side lighting group, and formed as a multi-layers with the horizontal portion.

12. The photography studio with the turntable driving mechanism as claimed in claim 11, further comprising a rear side lighting group, wherein the rear side lighting group is disposed adjacent to the curved surface and the vertical portion, and disposed at the same side of the curved translucent plastic plate with the bottom side lighting group.

13. The photography studio with the turntable driving mechanism as claimed in claim 1, wherein each of upper edges of the timing pulleys driven by the timing belt and the idlers is embedded with a rubber ring for contacting with the side surface of the transparent glass round platter.

* * * * *